(12) United States Patent
Fosdick (10) Patent No.: US 10,225,282 B2
(45) Date of Patent: Mar. 5, 2019

(54) SYSTEM, METHOD AND PROGRAM PRODUCT TO IDENTIFY A DISTRIBUTED DENIAL OF SERVICE ATTACK

(75) Inventor: Nicolas E. Fosdick, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 2827 days.

(21) Appl. No.: 11/106,286

(22) Filed: Apr. 14, 2005

(65) Prior Publication Data
US 2006/0236401 A1 Oct. 19, 2006

(51) Int. Cl.
*G06F 11/00* (2006.01)
*H04L 29/06* (2006.01)

(52) U.S. Cl.
CPC ...... *H04L 63/1458* (2013.01); *H04L 63/0263* (2013.01); *H04L 63/1408* (2013.01); *H04L 63/1433* (2013.01); *H04L 63/1441* (2013.01)

(58) Field of Classification Search
CPC ............. H04L 63/1408; H04L 63/1433; H04L 63/1441; H04L 63/1458
(Continued)

(56) References Cited

U.S. PATENT DOCUMENTS 6,018,619 A 1/2000 Allard et al. ............ 395/200.54
6,163,802 A 12/2000 Lin et al.
(Continued)

FOREIGN PATENT DOCUMENTS

JP 3229545 A 10/1991
JP 2001134544 A 5/2001 ........... G06F 15/177
(Continued)

OTHER PUBLICATIONS

The Spamhaus Project. Dec. 11, 2001. Retrieved from <http://web.archive.org/web/20011211165406/http://www.spamhaus.org/sbl/> on Jun. 9, 2008.
(Continued)

*Primary Examiner* — Saleh Najjar
*Assistant Examiner* — Peiliang Pan
(74) *Attorney, Agent, or Firm* — Schmeiser, Olsen & watts, LLP; William Hartwell (57) ABSTRACT

System, method and computer program product for detecting a denial of service attack on a plurality of computers. Records are made of source IP addresses of requests sent to each of the computers. The records of requests sent to the plurality of computers are totalled per source IP address and/or per range of source IP addresses. A determination is made if the total for a source IP address and/or range of source IP addresses exceeds a respective, predetermined threshold. If so, a denial of service attack is suspected or determined, and a firewall can be notified to block subsequent requests from the source IP address and/or range of source IP addresses, and an administrator can be notified to investigate the situation. Records can also be made of requests sent to each of the computers for a file or access to an application. These records of requests sent to the plurality of computers are totalled per file or application access. A determination is made if the total for a file or application access exceeds a predetermined threshold. If so, a denial of service attack is suspected or determined, and an administrator can be notified to investigate the situation.

20 Claims, 3 Drawing Sheets

(58) Field of Classification Search
USPC ........ 713/1, 2, 188, 194; 380/200, 201, 255, 380/277; 726/2, 11, 23, 25
See application file for complete search history.

(56) References Cited

U.S. PATENT DOCUMENTS

| | | | |
|---|---|---|---|
| 6,189,035 B1 | 2/2001 | Lockhart et al. | |
| 6,219,706 B1* | 4/2001 | Fan et al. | 709/225 |
| 6,266,692 B1 | 7/2001 | Greenstein | |
| 6,339,784 B1 | 1/2002 | Morris et al. | |
| 6,484,197 B1 | 11/2002 | Donohue | |
| 6,507,866 B1 | 1/2003 | Burchi | |
| 6,546,416 B1 | 4/2003 | Kirsch | |
| 6,622,193 B1 | 9/2003 | Avery | |
| 6,643,694 B1 | 11/2003 | Chernin | 709/223 |
| 6,941,348 B2* | 9/2005 | Petry et al. | 709/206 |
| 7,051,369 B1* | 5/2006 | Baba | 726/23 |
| 7,058,974 B1* | 6/2006 | Maher et al. | 726/13 |
| 7,072,944 B2 | 7/2006 | Lalonde et al. | |
| 7,117,358 B2 | 10/2006 | Bandini et al. | |
| 7,174,453 B2 | 2/2007 | Lu | |
| 7,203,749 B2 | 4/2007 | Hiraga | |
| 7,249,175 B1 | 7/2007 | Donaldson | |
| 7,331,060 B1* | 2/2008 | Ricciulli | 726/22 |
| 7,346,700 B2 | 3/2008 | Gould et al. | |
| 7,418,733 B2* | 8/2008 | Connary et al. | 726/25 |
| 8,230,507 B1* | 7/2012 | Njemanze et al. | 726/23 |
| 8,774,203 B2 | 7/2014 | Scott et al. | |
| 2002/0035683 A1* | 3/2002 | Kaashoek et al. | 713/154 |
| 2002/0052919 A1 | 5/2002 | Morris et al. | |
| 2003/0002436 A1* | 1/2003 | Anderson et al. | 370/218 |
| 2003/0105855 A1* | 6/2003 | Wynnyk | 709/224 |
| 2003/0182401 A1 | 9/2003 | Moriya | 709/219 |
| 2003/0236847 A1 | 12/2003 | Benowitz et al. | |
| 2004/0064351 A1* | 4/2004 | Mikurak | 705/7 |
| 2004/0177120 A1 | 9/2004 | Kirsch | |
| 2004/0250124 A1* | 12/2004 | Chesla et al. | 713/201 |
| 2004/0250169 A1* | 12/2004 | Takemori et al. | 714/38 |
| 2005/0039104 A1* | 2/2005 | Shah et al. | 714/776 |
| 2005/0080855 A1 | 4/2005 | Murray | |
| 2005/0120118 A1 | 6/2005 | Thibadeau | |
| 2005/0160148 A1 | 7/2005 | Yu | |
| 2005/0188028 A1 | 8/2005 | Brown et al. | |
| 2005/0198159 A1 | 9/2005 | Kirsch | |
| 2005/0198160 A1 | 9/2005 | Shannon et al. | |
| 2005/0249214 A1* | 11/2005 | Peng | 370/392 |
| 2006/0059238 A1 | 3/2006 | Slater et al. | |
| 2006/0077964 A1* | 4/2006 | Wu et al. | 370/352 |
| 2006/0182034 A1* | 8/2006 | Klinker et al. | 370/238 |
| 2007/0005970 A1 | 1/2007 | Trupp et al. | |
| 2007/0083606 A1 | 4/2007 | Malik et al. | |
| 2007/0250058 A1 | 10/2007 | Kirsch et al. | |
| 2009/0037592 A1* | 2/2009 | Lyon | 709/228 |

FOREIGN PATENT DOCUMENTS

| | | |
|---|---|---|
| JP | 2003143182 A | 4/2003 |
| KR | 2002046269 | 6/2002 |
| WO | 0033205 A1 | 6/2000 |

OTHER PUBLICATIONS

"Source Filtering in IP Multicase Routing", Chang-Jung Kao, et al. IEEE 2001 pp. 82-90.
Research Disclosure "Method of Building a Dynamic, Learning Email Spam Filter Through Heuristics" RD n 455 Mar. 2002 # 151 p. 511.
Lambert, Anselm, "Analysis of Spam"; Sep. 2003: Department of Computer Science, University of Dublin, Trinity College, p. 74.
Barracuda Networks; "Spam Firewall", Archive date: Oct. 1, 2003 access date: Nov. 13, 2007.
Lisa 2002 Paper "Spam Blocking With a Dynamically Updated Firewall Ruleset" Deeann N. M. Mikula, Christ Tracy,a nd Mikee Hooling-Telerama Public Access Internet pp. 13-20.
Modiano, US H2103 H (this is a US patent but this form will not accept the proceeding Patent No.), Published: May 4, 2004, 1 page.

* cited by examiner

SYSTEM, METHOD AND PROGRAM PRODUCT TO IDENTIFY A DISTRIBUTED DENIAL OF SERVICE ATTACK

FIELD OF THE INVENTION

The present invention relates generally to computer systems, and more particularly to a technique to identify a denial of service attack on a group of computers.

BACKGROUND OF THE INVENTION

A denial of service attack is the flooding of a computer, such as a server, with requests, such as "get" and "post" HTTP requests for web pages, TCP/IP requests for information, FTP or SCP requests for a file, and LDAP directory requests, and requests to open a session. This flood burdens the computer, i.e. consumes the computer's resources (such as processor, memory, etc.), so the computer cannot handle other, legitimate requests in a timely manner. Typically, the requests of the denial of service of attack originate from one source IP address or a range of source IP addresses within a same subnet. It was known to automatically examine the source IP addresses of requests, received by a computer, and determine the total number of requests originating from the same source IP address or range of source IP addresses over a predetermined unit of time. If this number exceeds a respective threshold or is much larger than experienced in the past, this may indicate a denial of service attack. In such a case, a known Denial of Service Analyzer ("DOSA") program would automatically update/reconfigure a firewall to block subsequent incoming requests from this source IP address or range of source IP addresses, and notify an administrator. The DOSA program would use a combination of historical as well as a mathematical algorithm(s) to determine if the requests were bona fide. If the program is not configured to automatically update the firewall rules automatically, the program will send an e-mail to the administrator. If the administrator confirms a denial of service attack, then the administrator would manually update/reconfigure the firewall to block subsequent incoming requests from this source IP address or range of source IP addresses.

There are other known ways to identify a denial of service attack. A known DOSA program determines a total number of requests for a specific file or application, from any source IP address. If that number is excessive based on historical data and/or hard coded rules, then the DOSA program notifies an administrator that a denial of service attack is suspected or modifies the firewall rules to block the offending requests.

It was also known to organize computers into a cluster for load balancing and to provide high reliability in case of failure of one computer in the cluster. Each of the computers in the cluster typically executes the same application(s). It was also known to provide a "proxy" server to act as a gateway to the cluster. The proxy server receives all requests for the cluster, and distributes them to the computers in the cluster according to a load balancing algorithm. For high volume applications, there may be more than one cluster of computers, each with its own proxy server. In such a case, there may be a load balancer as a gateway to the proxy servers. The load balancer determines which proxy server to route each request, based on a known load balancing algorithm which evaluates the availability of the servers within each cluster.

If a denial of service attack is directed to two or more (stand-alone) computers or clusters of servers, the associated requests are divided between the two or more (stand-alone) computers or proxy servers. In such a case, the denial of service attack may be difficult to detect because no one computer or proxy server may receive more than a predetermined threshold number of requests.

Accordingly, an object of the present invention is to detect a denial of service attack directed to two or more computers or clusters or computers.

SUMMARY OF THE INVENTION

The invention resides in a system, method and computer program product for detecting a denial of service attack on a plurality of computers. Records are made of source IP addresses of requests sent to each of the computers. The records of requests sent to the plurality of computers are totalled per source IP address. A determination is made if the total for a source IP address exceeds a predetermined threshold. If so, a denial of service attack is suspected or determined, and a firewall can be notified to block subsequent requests from the source IP address and/or an administrator can be notified to investigate the situation.

The invention also resides in a system, method and computer program product for detecting a denial of service attack on a plurality of computers. Records are made of source IP addresses of requests sent to each of the computers. The records of requests sent to the plurality of computers are totalled per range of source IP addresses. A determination is made if the total for a range of source IP address exceeds a predetermined threshold. If so, a denial of service attack is suspected or determined, and a firewall can be notified to block subsequent requests from the range of source IP addresses and/or an administrator can be notified to investigate the situation.

The invention resides in a system, method and computer program product for detecting a denial of service attack on a plurality of computers. Records are made of requests sent to each of the computers for a file or access to an application. The records of requests sent to the plurality of computers are totalled per file or application access. A determination is made if the total for a file or application access exceeds a predetermined threshold. If so, a denial of service attack is suspected or determined, and an administrator can be notified to investigate the situation.

DETAILED DESCRIPTION OF THE PREFERRED EMBODIMENTS

Figure 1:
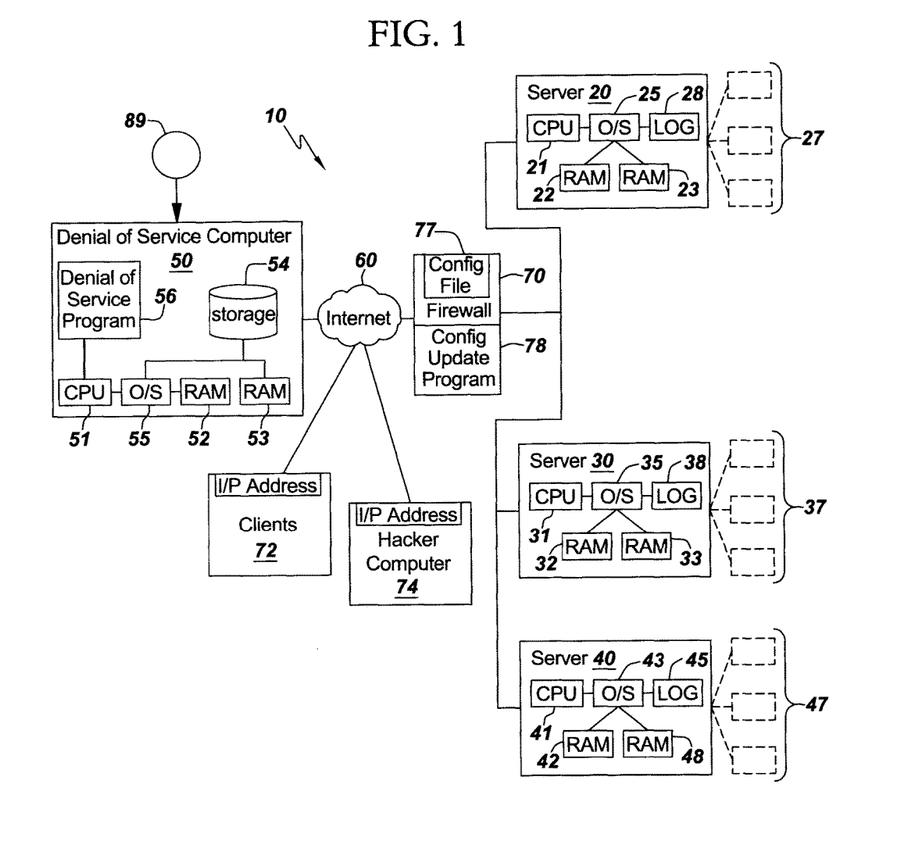
FIG. 1 is a block diagram of a distributed computer system including multiple servers which are subject to a denial of service attack, and a denial of service detection computer according to the present invention.

The present invention will now be described in detail with reference to the figures. FIG. 1 illustrates a distributed computer system generally designated 10 in which the present invention is incorporated. Distributed computer system 10 includes multiple server computers 20, 30 and 40 (although there could be as few as two or more than three server computers protected by the present invention). Server computers 20, 30 and 40 have respective, different IP addresses. Server computer 20 includes a known CPU 21, RAM 22, ROM 23, disk storage 24, operating system 25 and log 28. Server computer 30 includes a known CPU 31, RAM 32, ROM 33, disk storage 34, operating system 35 and log 38. Server computer 40 includes a known CPU 41, RAM 42, ROM 43, disk storage 44, operating system 45 and log 48. Each of the server computers 20, 30 and 40 can be an application server or other type of server which directly handles client requests, or can be a proxy server for respective clusters of servers (such as clusters of application servers) 27, 37 and 47. Distributed computer system 10 also includes a denial of service detection computer 50 coupled to the server computers 20, 30 and 40 via the Internet 60 or some other type of network. Computer 50 includes a known CPU 51, RAM 52, ROM 53, disk storage 54 and operating system 55. A firewall 70 protects servers 20, 30 and 40 from specified types of unwanted requests, for example, receipt of requests originating from certain IP addresses, requests using certain protocols, requests addressed to certain ports of the servers 20, 30 and 40, etc., to the extent that firewall 70 has been configured to block these IP addresses, protocols, ports, etc.

Computer 50 also includes a denial of service detection program 56 according to the present invention to detect a denial of service attack spread across servers 20, 30 and 40. As explained in more detail below, each of the servers 20, 30 and 40 records information about each request it receives. The requests can be "get" and "post" HTTP requests for web pages, TCP/IP requests for information, FTP or SCP requests for a file, LDAP directory requests, and/or requests to open a session. These requests originated from legitimate clients 72 and possibly from a malicious hacker 74, via the Internet 60. The recorded information includes the source IP address of the request, destination address (such as URI) of the request, identity of requested file in the case of FTP and SCP requests, and type of information in the case of an LDAP request. Denial of service detection program 56 periodically requests these log records from servers 20, 30 and 40 via the Internet 60, sorts or groups the records by source IP address, and then totals the number of requests received by all three servers 20, 30 and 40 from each source IP address. Program 56 also identifies ranges of source IP addresses that have sent the requests, and totals the number of requests from each range of source IP address. If the total number of requests from any source IP address or range of source IP addresses exceeds a respective, predetermined threshold over a predetermined unit of time, then the denial of service detection program 56 can automatically update/reconfigure the firewall 70 to block subsequent requests from such source IP addresses or range of source IP addresses. This update/reconfiguration can be an update to a file within firewall 70 which lists the blocked source IP addresses or range of source IP addresses. Instead of or in addition to the automatic update of firewall 70, program 56 will notify an administrator that the source IP address or range of source IP addresses may be the source of a denial of service attack. The notification includes the information logged by the servers 20, 30 and 40, in a combined manner, for the source IP address or range of source IP addresses which have sent an excessive number of requests. Thus, the information includes the (suspect) source IP address or range of source IP addresses, total number of requests from the (suspect) source IP address or range of source IP addresses (received by all servers 20, 30 and 40), destination addresses (such as URIs) of the requests from the (suspect) source IP address or range of source IP addresses, identities of requested files in the case of FTP and SCP requests from (suspect) source IP address or range of source IP addresses, and types of requested information in the case of an LDAP request from the (suspect) source IP address or range of source IP addresses. Then, the administrator can conduct further analysis, based on this information, to determine if in fact there has been a denial of service attack. The further analysis may include checking of historical data, i.e. (a) whether the number of requests from the (suspect) source IP address or range of source IP addresses is large compared to the total number of requests from all source IP addresses in the past periods, (b) whether the number of requests from the (suspect) source IP address or range of source IP addresses for a specific file or application is above a predetermined threshold or large compared to past periods, (c) whether the (suspect) source IP address or range of source IP addresses is known to be legitimate or (d) whether current conditions, such as a product or service promotion, caused an increased, legitimate need for the requests from the (suspect) source IP address or range of source IP addresses. If the administrator concludes that there has been a denial of service attack, then the administrator can update/reconfigure firewall 70 to block subsequent incoming requests from this source IP address or range of source IP addresses. This update/reconfiguration can be an update to a file within firewall 70 which lists the blocked source IP addresses or range of source IP addresses.

Figure 2A:
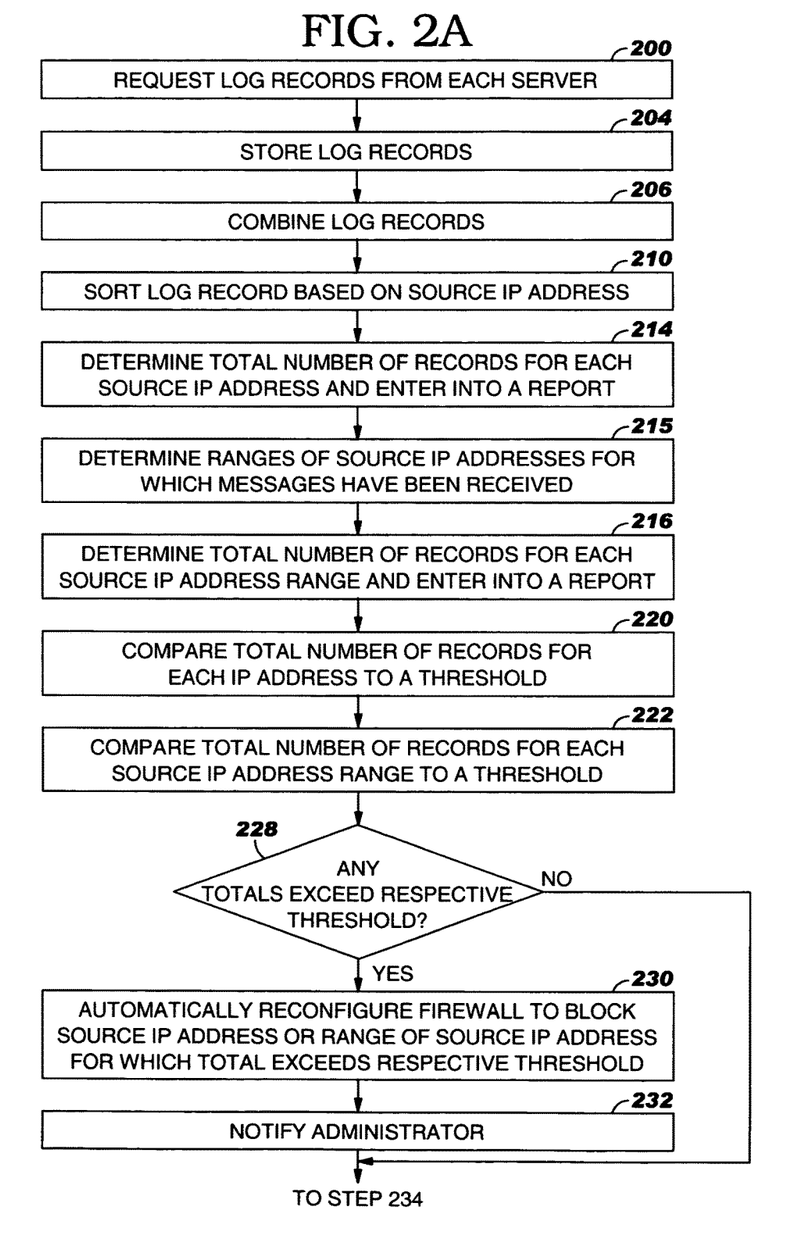
FIGS. 2(A) and 2(B) form a flowchart illustrating the function of a denial of service detection program within the denial of service detection computer of FIG. 1.
Figure 2B:
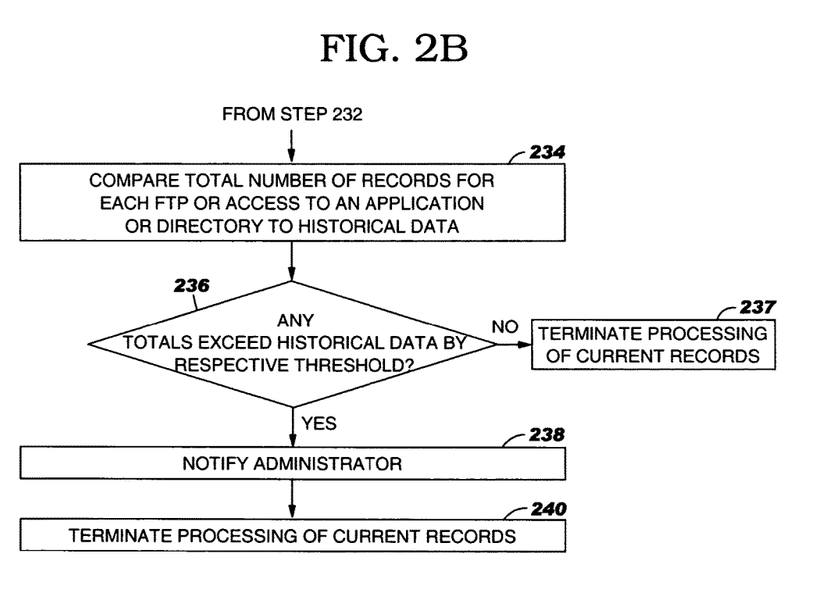

FIG. 2 illustrates the function of the denial of service detection program 56 in more detail. In step 200, the denial of service detection program 56 sends requests to servers 20, 30 and 40 to read the contents of their respective logs 28, 38 and 48. These logs contain records, as described above, of the requests which servers 20, 30 and 40 have received, including legitimate requests from clients 72 and malicious/flooding requests from hacker 74. In response to the log requests, each of the servers 20, 30 and 40 sends its records to denial of service detection computer 50 which stores them for denial of service detection program 56 (step 202). Next, denial of service detection program 56 merges/combines the records from all three servers 20, 30 and 40 (step 204). Next, denial of service detection program 56 sorts (groups together) the combined records based on source IP address (step 210) and then totals the number of requests originating from the same source IP address (step 214). Next, denial of service detection program 56 identifies the requests that originate from a same range of source IP addresses (steps 215 and 216). By way of example, all source IP addresses from a same subnet are considered as originating from a same range of source IP addresses. A "subnet" is a group of computers that are logically grouped together on a network. Typically, the subnet is identified by the same, first two or three octets of their source IP addresses.

Next, the denial of service detection program 56 compares the total number of requests from each source IP address to a threshold (step 220). Next, the denial of service detection program 56 compares the total number of requests from each range of source IP addresses to another threshold (step 222). If none of the totals determined in steps 220 or 222 exceeds the respective threshold (decision 228, no branch), then the denial of service detection program 56 jumps to step 234; denial of service detection program 56 does not yet suspect a denial of service attack, but will review the records for another possible type of denial of service attack, as described below. Refer again to decision 228, yes branch where the number of requests from any source IP address or range of source IP addresses exceeds the respective threshold, then the denial of service detection program 56 can proceed in a variety of manners in step 230. In one embodiment of the present invention, program 56 automatically sends a request to firewall 70 so that firewall 70 will block subsequent requests from this source IP address or range of source IP addresses from proceeding to servers 20, 30 and 40 (step 230). The request includes the identity of the malicious source IP address or range of source IP addresses. This request can be in the form of a script program which automatically updates a configuration file 77 within the firewall 70 to list the malicious source IP address or range of source IP addresses. Based on this list, firewall 70 will subsequently block requests from the malicious IP address or range of IP addresses. Alternately, the request can identify the source IP address or range of source IP addresses as malicious, and a configuration update program 78 within firewall 70 will automatically update the configuration file 77 to list the malicious source IP address or range of source IP addresses. Based on this list, firewall 70 will subsequently block requests from this source IP address or range of source IP addresses. In these embodiments of step 230, the denial of service detection program 56 will also notify an administrator of the firewall that the firewall's configuration file was updated, and the basis for the update, i.e. the identity of the malicious source IP address or range of source IP addresses, the total number of requests from the malicious source IP address or range of source IP addresses within the current period, for example one hour (step 232).

Next, the denial of service detection program compares the total number of current requests for each application/URI, FTP file and/or LDAP directory, from all source IP addresses, to historical numbers for requests for the same application/URI, FTP file and/or LDAP directory, during previous periods (step 234). In step 234, the denial of service program also determines how much, if any, the number of current requests for each application/URI, FTP file and/or LDAP directory exceeds the historical peak and average for the same types of requests, and if so, compares the excesses to respective thresholds. If none of the totals determined in steps 234 and 236 exceeds the historical average or peak by the respective threshold (decision 236, no branch), then the denial of service detection program 56 terminates its processing of these records; no denial of service attacks are suspected (step 237). However, if the number of requests for the same application/URI, FTP file and/or LDAP directory in the current period exceeds the historical average or peak for the same application/URI, FTP file and/or LDAP directory by respective threshold amounts (decision 236, yes branch), then the denial of service detection program notifies an administrator of a suspected denial of service attack (step 238). This notification includes the recorded information for the application/URI, FTP file and/or LDAP directory with the excessive number of requests.

After step 238, denial of service detection program 56 terminates its processing of the current records; the denial of service detection program 56 has completed its function (step 240).

In another embodiment of the present invention, the denial of service detection program does not automatically update the configuration file 77 of firewall 70 to block subsequent (incoming) requests from the source IP address or range of source IP addresses that has sent the large number of requests. Instead, the denial of service detection program 56 skips step 230 and notifies an administrator to conduct further analysis of the source IP address or range of source IP addresses which has sent the unusually large number of requests, as described above (step 232). The purpose of the analysis is to determine if these requests are in fact malicious, as described above. If the source IP address or range of source IP addresses is determined to be malicious, the administrator can manually update the configuration file 77 within firewall 70 to block subsequent (incoming) requests from this source IP address or range of source IP addresses, from proceeding to servers 20, 30 and 40. After step 232, denial of service detection program 56 terminates its processing of these records; the denial of service detection program 56 has completed its function (step 240).

The denial of service detection program 56 can be loaded into denial of service detection server 50 from a computer readable storage device such as a magnetic, optical, DVD disk or tape 89 or read/downloaded from the Internet 60. The term "computer readable storage device" does not encompass a signal propagation media such as a copper cable, optical fiber or wireless transmission media.

Based on the foregoing, a system, method and program product have been disclosed for detecting a denial of service attack spread across two or more computers. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for detecting a denial of service attack on a plurality of destination computers, the method comprising the steps of:
   a management server obtaining from the destination computers records of respective requests previously received by the destination computers from a plurality of source computers, wherein each request is a message, wherein each request comprises a source IP address of one of the source computers and a destination address of one of the destination computers, wherein the obtaining the records comprises: periodically requesting from the destination computers logged recordings of the requests received by the destination computers from the source computers, and in response, receiving the requested logged recordings from the destination computers, and wherein the obtained records comprise the received logged recordings;
   the management server determining, from an analysis of the obtained records, that the total number of requests sent over a specified period of time by one source computer of the plurality of source computers to the destination computers exceeds a specified threshold, and in response, the management server configuring a firewall to block subsequent requests sent by the one source computer from being received by the destination computers; and
   the management server determining that a total number of requests sent by the one source computer for a specific file or application exceeds a specified first threshold value.

2. The method of claim 1, wherein each obtained record includes a source IP address of the source computer from which the respective request was received, and wherein the method further comprises the steps of:
   the management server grouping the obtained records by source IP address into a plurality of groups of records such that the records in each group comprise a same source IP address, which results in each group being associated with a respective source computer; and
   the management server determining the total number of requests sent by each source computer as being the total number of records in the group associated with the respective source computer.

3. The method of claim 1, wherein each record of the respective request comprises data including a source IP address of the respective request and a destination address of the respective request, and wherein the method further comprises the step of:

in response to the determining that the total number of requests sent by the one source computer exceeds the specified threshold, the management server notifying an administrator that the one source computer may be a source of a denial of service attack, wherein the notifying includes providing to the administrator the data in the records pertaining to the requests received from the one source computer.

4. The method of claim 3, wherein one request received from the one source computer is a SCP request or a LDAP request, and wherein the data in the record of the one request further includes (i) an identity of a requested file if the one request is the SCP request, or (ii) a type of requested information if the one request is the LDAP request.

5. The method of claim 4, wherein the one request received from the one source computer is the SCP request.

6. The method of claim 4, wherein the one request received from the one source computer is the LDAP request.

7. The method of claim 1, wherein the requests include access requests for access to an application, and wherein the method further comprises the step of:

the management server determining, from the obtained records, that a total number of the access requests exceeds a predetermined threshold, and in response, the management server notifying an administrator that the access requests may be associated with a denial of service attack, wherein the notifying includes providing to the administrator information for the application in the obtained records.

8. The method of claim 1, wherein the method further comprises the step of:

in response to the management server having determined that the total number of requests sent by the one source computer for the specific file or application exceeds the specified first threshold value by an excess number of requests, the management server determining that the excess number of requests exceeds a specified second threshold value.

9. A management system for detecting a denial of service attack on a plurality of destination computers, the management system comprising:

a CPU;
a computer readable memory;
a computer readable storage device;
first program instructions to obtain from the destination computers records of respective requests previously received by the destination computers from a plurality of source computers, wherein each request is a message, wherein each request comprises a source IP address of one of the source computers and a destination address of one of the destination computers, wherein the first program instructions to obtain the records comprises: program instructions to periodically request from the destination computers logged recordings of the requests received by the destination computers from the source computers, and in response, to receive from the destination computers the requested logged recordings, and wherein the obtained records comprises the received logged recordings;
second program instructions to determine, from an analysis of the obtained records, that the total number of requests sent over a specified period of time by one source computer of the plurality of source computers to the destination computers exceeds a specified threshold, and in response, to configure a firewall to block subsequent requests sent by the one source computer from being received by the destination computers; and
third program instructions to determine that a total number of requests sent by the one source computer for a specific file or application exceeds a specified first threshold value, wherein the first, second and second third program instructions are stored on the computer readable storage device for execution by the CPU via the computer readable memory.

10. The system of claim 9, wherein each obtained record includes a source IP address of the source computer from which the respective request was received, and wherein the system further comprises:

fourth program instructions to group the obtained records by source IP address into a plurality of groups of records such that the records in each group comprise a same source IP address, which results in each group being associated with a respective source computer; and fifth program instructions to determine the total number of requests sent by each source computer as being the total number of records in the group associated with the respective source computer, wherein the fourth and fifth program instructions are stored on the computer readable storage device for execution by the CPU via the computer readable memory.

11. The system of claim 9, wherein each record of the respective request comprises data including a source IP address of the respective request and a destination address of the respective request, and wherein the system further comprises:

fourth program instructions to notify an administrator, in response to the determination that the total number of requests sent by the one source computer exceeds the specified threshold, that the one source computer may be a source of a denial of service attack, wherein the to notify includes to provide to the administrator the data in the records pertaining to the requests received from the one source computer, wherein the fourth program instructions are stored on the computer readable storage device for execution by the CPU via the computer readable memory.

12. The system of claim 9, wherein the requests include access requests for access to an application, and wherein the system further comprises:

fourth program instructions to determine, from the obtained records, that a total number of the access requests exceeds a predetermined threshold, and in response, to notify an administrator that the access requests may be associated with a denial of service attack, wherein the to notify includes to provide to the administrator information for the application in the obtained records, wherein the fourth program instructions are stored on the computer readable storage device for execution by the CPU via the computer readable memory.

13. A computer program product for execution in a management system to detect a denial of service attack on a plurality of destination computers, the computer program product comprising:

a computer readable storage device;
first program instructions to obtain from the destination computers records of respective requests previously received by the destination computers from a plurality of source computers, wherein each request is a message, wherein each request comprises a source IP address of one of the source computers and a destination address of one of the destination computers, wherein the first program instructions to obtain the records comprises: program instructions to periodically request from the destination computers logged recordings of the requests received by the destination computers from the source computers, and in response, to receive from the destination computers the requested logged recordings, and wherein the obtained records comprises the received logged recordings; and second program instructions to determine, from an analysis of the obtained records, that the total number of requests sent over a specified period of time by one source computer of the plurality of source computers to the destination computers exceeds a specified threshold, and in response, to configure a firewall to block subsequent requests sent by the one source computer from being received by the destination computers; and third program instructions to determine that a total number of requests sent by the one source computer for a specific file or application exceeds a specified first threshold value, wherein the first, second and third program instructions are stored on the computer readable storage device for execution by a CPU.

14. The computer program product of claim 13, wherein each obtained record includes a source IP address of the source computer from which the respective request was received, and wherein the system further comprises:

fourth program instructions to group the obtained records by source IP address into a plurality of groups of records such that the records in each group comprise a same source IP address, which results in each group being associated with a respective source computer; and fifth program instructions to determine the total number of requests sent by each source computer as being the total number of records in the group associated with the respective source computer, wherein the fourth and fifth program instructions are stored on the computer readable storage device for execution by the CPU.

15. The computer program product of claim 13, wherein each record of the respective request comprises data including a source IP address of the respective request and a destination address of the respective request, and wherein the system further comprises:

fourth program instructions to notify an administrator, in response to the determination that the total number of requests sent by the one source computer exceeds the specified threshold, that the one source computer may be a source of a denial of service attack, wherein the to notify includes to provide to the administrator the data in the records pertaining to the requests received from the one source computer, wherein the fourth program instructions are stored on the computer readable storage device for execution by the CPU.

16. The computer program product of claim 15, wherein one request received from the one source computer is a SCP request or a LDAP request, and wherein the data in the record of the one request further includes (i) an identity of a requested file if the one request is the SCP request, or (ii) a type of requested information if the one request is the LDAP request.

17. The computer program product of claim 13, wherein the requests include access requests for access to an application, and wherein the system further comprises:

fourth program instructions to determine, from the obtained records, that a total number of the access requests exceeds a predetermined threshold, and in response, to notify an administrator that the access requests may be associated with a denial of service attack, wherein the to notify includes to provide to the administrator information for the application in the obtained records, wherein the fourth program instructions are stored on the computer readable storage device for execution by the CPU via the computer readable memory.

18. A method for detecting a denial of service attack on a plurality of destination computers, the method comprising the steps of:

a management server obtaining from the destination computers records of respective requests previously received by the destination computers from a plurality of source computers, wherein each request is a message, wherein each request comprises a source IP address of one of the source computers and a destination address of one of the destination computers, wherein the obtaining the records comprises: periodically requesting from the destination computers logged recordings of the requests received by the destination computers from the source computers, and in response, receiving the requested logged recordings from the destination computers, and wherein the obtained records comprise the received logged recordings;

the management server determining, from an analysis of the obtained records, that the total number of requests sent over a specified period of time by one source computer of the plurality of source computers to the destination computers exceeds a specified threshold, and in response, the management server configuring a firewall to block subsequent requests sent by the one source computer from being received by the destination computers; and the management server determining that a product or service promotion caused an increased need for the requests sent by the one source computer.

19. A management system for detecting a denial of service attack on a plurality of destination computers, the management system comprising:

a CPU;

a computer readable memory;

a computer readable storage device;

first program instructions to obtain from the destination computers records of respective requests previously received by the destination computers from a plurality of source computers, wherein each request is a message, wherein each request comprises a source IP address of one of the source computers and a destination address of one of the destination computers, wherein the first program instructions to obtain the records comprises: program instructions to periodically request from the destination computers logged recordings of the requests received by the destination computers from the source computers, and in response, to receive from the destination computers the requested logged recordings, and wherein the obtained records comprises the received logged recordings;

second program instructions to determine, from an analysis of the obtained records, that the total number of requests sent over a specified period of time by one source computer of the plurality of source computers to the destination computers exceeds a specified threshold, and in response, to configure a firewall to block subsequent requests sent by the one source computer from being received by the destination computers; and third program instructions to determine that a product or service promotion caused an increased need for the requests sent by the one source computer, wherein the first, second and third program instructions are stored on the computer readable storage device for execution by the CPU via the computer readable memory.

20. A computer program product for execution in a management system to detect a denial of service attack on a plurality of destination computers, the computer program product comprising:

a computer readable storage device;

first program instructions to obtain from the destination computers records of respective requests previously received by the destination computers from a plurality of source computers, wherein each request is a message, wherein each request comprises a source IP address of one of the source computers and a destination address of one of the destination computers, wherein the first program instructions to obtain the records comprises: program instructions to periodically request from the destination computers logged recordings of the requests received by the destination computers from the source computers, and in response, to receive from the destination computers the requested logged recordings, and wherein the obtained records comprises the received logged recordings;

second program instructions to determine, from an analysis of the obtained records, that the total number of requests sent over a specified period of time by one source computer of the plurality of source computers to the destination computers exceeds a specified threshold, and in response, to configure a firewall to block subsequent requests sent by the one source computer from being received by the destination computers; and third program instructions to determine that a product or service promotion caused an increased need for the requests sent by the one source computer, wherein the first, second and third program instructions are stored on the computer readable storage device for execution by a CPU.

* * * * *